United States Patent [19]

Hughes et al.

[11] Patent Number: 5,552,057
[45] Date of Patent: Sep. 3, 1996

[54] WATER-PURIFYING DEVICE

[76] Inventors: Doug Hughes, 1335 Greg St., Ste. #104, Sparks, Nev. 89431; Roger Reid, P.O. Box 1359, Caldwell, Id. 83605

[21] Appl. No.: 423,393

[22] Filed: Apr. 17, 1995

Related U.S. Application Data

[63] Continuation-in-part of Ser. No. 69,600, Jun. 1, 1993, Pat. No. 5,407,573.

[51] Int. Cl.$^6$ .................................. C02F 1/42; C02F 1/50
[52] U.S. Cl. ........................ 210/668; 210/669; 210/753; 210/764; 210/266; 210/282; 210/283; 210/284; 210/285; 210/287; 210/288
[58] Field of Search .................................. 210/282, 266, 210/283, 284, 285, 286, 287, 288, 289, 290, 663, 668, 669, 753, 764

[56] References Cited

U.S. PATENT DOCUMENTS

| | | | |
|---|---|---|---|
| 2,792,942 | 5/1957 | Feuillet | 210/501 |
| 4,187,183 | 2/1980 | Hatch | 210/501 |
| 4,190,529 | 2/1980 | Hatch | 210/29 |
| 4,198,296 | 4/1980 | Doumas et al. | 210/501 |
| 4,555,347 | 11/1985 | O'Dowd et al. | 210/752 |
| 4,610,783 | 9/1986 | Hudson | 210/501 |
| 4,769,143 | 9/1988 | Deutsch et al. | 210/266 |
| 4,888,118 | 12/1989 | Barnes et al. | 210/668 |
| 4,995,976 | 2/1991 | Vermes et al. | 210/266 |
| 5,061,367 | 10/1991 | Hatch et al. | 210/137 |
| 5,106,501 | 4/1992 | Yang et al. | 210/266 |
| 5,126,044 | 6/1992 | Magnusson et al. | 210/282 |
| 5,269,919 | 12/1993 | von Medlin | 210/256 |
| 5,308,482 | 5/1994 | Mead | 210/207 |
| 5,385,667 | 1/1995 | Steger | 210/266 |
| 5,401,399 | 3/1995 | Magnusson et al. | 210/136 |
| 5,405,526 | 4/1995 | Sutera | 210/474 |
| 5,407,573 | 4/1995 | Hughes | 210/266 |
| 5,456,831 | 10/1995 | Sullivan | 210/282 |
| 5,478,467 | 12/1995 | LeMire et al. | 210/449 |

FOREIGN PATENT DOCUMENTS

WO87/01688  3/1987  WIPO .................. C02F 1/70

*Primary Examiner*—Cynthia L. Nessler
*Attorney, Agent, or Firm*—Ken J. Pedersen; Barbara S. Pedersen

[57] ABSTRACT

A filter for disinfecting non-potable water is disposed in-line in a water delivery pipe, such filter having a plurality of chambers. The first chamber contains biocidal resin which imparts a biocide residue to the water as it passes therethrough to kill microorganisms. The water then passes through a turbulating disk to an extended contact time chamber of a selected volume to allow further contact time between the biocide residue and any microorganisms in the water. The water then passes through a 1–3 micron screen, which acts to retain protozoan cysts within the filter, and then passes through a biocide removal chamber containing medias which remove the biocide from the water. The water then passes through a chamber containing bacteriostatic media which acts to prevent back contamination from the effluent end of the filter.

18 Claims, 2 Drawing Sheets

WATER-PURIFYING DEVICE

This application is a continuation-in-part of the previous patent application entitled Continuous Flow Water-purifying Device filed 06/01/93 Ser. No. 08/069,600, now U.S. Pat. No. 5,407,573.

BACKGROUND OF THE INVENTION

1. Field of the Invention

The device of this invention resides in the area of water filters for the disinfection of non-potable water and more particularly relates to a continuous flow, in-pipe-line filter having a high flow rate and having a plurality of linearly-aligned, internal chambers, the contents of which interact with the water passing there-through to destroy a broad range of pathogenic microorganisms in such water.

2. Description of the Prior Art

Non-potable water is currently treated to remove or destroy pathogenic microorganisms which cause intestinal diseases. Such treatments can utilize sub-micron filtration, ultraviolet light, ozone, and disinfection systems which utilize a wide range of disinfecting chemicals such as chlorine and a large variety of filter media well known in the prior art.

Certain disinfection processes use biocidal resins through which the water is passed. These biocidal resins can include resins previously treated in such a manner as to release a level of biocide such as iodine/iodides into the water. Such biocides function by destroying the outer cell wall of the microorganism when the microorganism comes in contact with the biocide that is held on the resin or released into the water by the resin. A minimum contact time between biocide and microorganism is often necessary for the destruction of pathogenic bacteria and most viruses. The longer the contact time, the greater the kill rate and efficiency of the device. Therefore, the destruction of such microorganisms has traditionally been accomplished by using a large volume of biocidal resin and channeling the water flow through such biocidal resin to achieve the necessary interaction time between the biocide, such as iodine/iodides, and the microorganisms. Thus, a large volume of resin and a low flow rate of water have traditionally been used to achieve the long contact time between biocide and microorganisms that is needed to destroy the microorganisms.

In some instances in the prior art, where influent water to be treated is highly contaminated, water still bearing biocide is passed from a biocide resin tank into a holding tank to provide for the killing of microorganisms requiring especially lengthy contact times. Such microorganisms include certain virus strains and protozoan cysts such as Giardia lamblia and Cryptosporidium cysts. Holding tanks of this nature generally require contact times of up to 20 minutes for protozoa and 30 minutes for certain viruses.

After water has been treated with biocide, it is undesirable to leave the biocide in the water, because of the many health hazards that result from the consumption of any biocide over an extended period of time. Some people are allergic to certain biocides, such as iodine, and common biocides such as chlorine have recently been associated with bladder cancer.

Iodinated resins, when used in sufficient quantity in a filter system having a properly-engineered flow rate of water there-through, are very effective in the destruction of microorganisms such as bacteria and viruses as long as the contact time of the biocide with the cell walls of the microorganisms is sufficient. If sufficient biocidal contact time is not provided, when the biocide is removed and biocidal action ceases, any remaining live microorganisms will survive and remain active in the drinking water. Since treatment of non-potable water can never be 100% effective, there is always some percentage of microorganisms which may escape destruction or retention. It is generally accepted therefore that the presence of minimal amounts of pathogenic organisms in potable water is inevitable and as the degree of contamination increases, the possibility that unacceptable levels of pathogens will escape treatment also increases.

SUMMARY OF THE INVENTION

The device of this invention has been designed to provide a water purification filter for safe, thorough and economical purification of non-potable water at a continuous, desirable flow rate.

It is an object of this invention to provide a device which can be installed directly in line in a cold water pipe line providing running water.

It is a further object of this invention to purify such running water of bacteria and most viruses, and to retain and destroy protozoan cysts.

The filter of this invention, being attached in-line in a cold water pipe line as an in-line filter or a filter cartridge, provides for purification of continuous running water, at a higher water flow rate relative to the amount of biocide resin compared to the prior art, and without the need for a settling/holding tank. This is accomplished by providing a novel extended contact time chamber within the device rather than merely by increasing the quantity of biocidal resin in the water such as practiced in the prior art. Also, for purifying water contaminated with viruses, cysts, or other microorganisms that require especially long contact with biocide, the present invention further provides a cyst-retention means such as a filter screen, preferably disposed in the extended contact chamber, which retains said viruses, cysts, and other microorganisms in the extended contact chamber for destruction by the biocide.

The use of the extended contact time chamber allows for the continued contact and interaction between biocide in the water and the microorganisms that have already been "partially-treated", that is, that have already been attacked in the resin chamber by biocide that is on the resin and in the water. Thus, the partially-treated microorganisms, after passing through the biocidal resin chamber, are given additional contact time with the biocide prior to removal of the biocide. This increased contact time, while the water is constantly flowing, allows continuous rather than batch purification, and allows for higher water flow rates per volume of biocidal resin than the prior art.

Thus, it has been found that, with the invented filter and filtering method, a relatively small amount of biocide resin (or, short contact time in the resin chamber) may be used, relative to that used in the prior art, because of the extended contact time chamber. This extended contact chamber is preferably substantially empty and thereby maximizes the contact time between partially-treated microorganisms and biocide for a given chamber volume. Experimentation has shown that replacing excess resin volume with empty extended contact chamber volume results in an overall reduction of total treatment volume, i.e., the resin chamber volume plus extended contact chamber volume. For embodiments designed for 99.9999% destruction of bacteria and most viruses, "excess resin chamber volume" is defined herein as volume creating more than about 3.7 seconds of contact time in the resin chamber. An "empty" chamber means that it contains no resin, filter media, or filler, but, during use, only contains the water being treated (plus the preferable baffle and filter screen at the inlet and outlet of the extended contact chamber, respectively).

Thus, it has been discovered to be a more efficient and effective design to place an empty extended contact chamber after a small resin chamber, and thereby reduce the overall total treatment volume and the resin cost. In other words, excess resin volume above the minimum is unnecessary, and effective microorganism destruction and greater economy are achieved by using the minimum, or close to the minimum, resin volume plus an extended contact time chamber. Such a design allows the filter of this invention to perform efficiently when high concentrations of contamination are found in the water to be treated. An increase in the empty extended contact chamber volume translates efficiently into longer biocide and microorganism contact time, and allows greater flow rates without the need for the introduction of a greater volume of biocide, provided the minimum resin chamber contact time is maintained.

It is also an object of this invention to disinfect the water in a manner which offers greater economy by its use of less biocide than prior art systems and while providing for the complete or near-complete removal of the biocide after disinfection of the water. The advantages of the device of this invention are twofold: greater economy reduces the overall cost of the device while virtually complete removal of the biocide allows the user to employ the device for daily consumption of potable water since the water is free of unacceptable levels of the biocide.

It is also a goal of this invention to destroy viruses and cysts that require especially long biocide contact times, without the need for holding tanks. The optional filter screen positioned in the extended contact chamber traps such viruses and cysts and holds them in contact with biocide long enough to destroy them.

It is also a goal of this invention to provide a water-purifying filter which can be used in combination with a pre-filtration system to effectively sterilize water of most of the common microorganisms which are found in non potable water including *E. coil,* cholera bacteria, most common virus strains, and protozoa. The device of this invention, in a preferred embodiment, can be installed generally in stationary water purification situations but can also be adapted for portable applications as well.

In use, the filter of this invention can receive pretreated water which has been treated for the removal of suspended solids and organic matter, such as by a silver-impregnated, granular activated carbon media bed or by granular activated carbon without silver impregnation. It is desirable to remove such solids and organic material from the water before passing it through a biocidal resin because organic matter in the influent untreated water will tend to oxidize the iodine first, thus diminishing its ability to act as a biocide. Also, organic matter, if collected in the post-sterilization portion of the filters would tend to increase the possibility for back-contamination of the device as described further below. Such pre-filter treatment can also be utilized to remove toxic chemicals and other contaminants. If one removes such organic contaminants through an activated carbon-type pre-filter, then only the later removal from the water of the remaining iodine/iodides, which are present after the biocide has acted on the microorganisms, is necessary.

The device, preferably being enclosed in a cylindrical pipe-like container, can be adapted for use as an in-line filter in a cold water pipe line or as a filter cartridge received in an in-line housing and preferably includes therein a series of linearly-aligned chambers. In the filter, water passes through a biocide chamber containing a biocide, such as an iodinated resin or other biocide media. In such biocidal resin chamber, the microorganisms contact the biocide held on the resin and the biocide released into the water, resulting in the iodine/iodides or other biocide interacting with the microorganisms, destroying many of them as described above. As the water passes through the biocidal resin chamber, it acquires levels of iodine/iodides which are lethal to microorganisms if the iodine/iodides in the water are left in contact a sufficient time with partially-treated microorganisms. It is in the nature of such resin after a point not to release further biocide into such biocide saturated water. Once the biocide has been introduced into the water and is encountered by the microorganisms, there is no additional benefit to be derived by having the water remain longer inside the biocidal resin chamber, if the biocide/microorganism contact time can be extended by other means. In the case of iodinated resins, for 99.9999% destruction of bacteria and most viruses, the preferred design provides at least 3.7 seconds of direct contact within the resin bed and 7 to 8 seconds extended contact immediately thereafter, which extended contact is most efficiently provided in an empty chamber.

The function of the extended contact time chamber as described here is not to create an opportunity for new contact between untreated microorganisms and the iodine/iodides. Rather, it is to allow microorganisms that have already come into direct contact with the biocide in the biocide chamber (herein called "partially-treated" or "partially-attacked" microorganisms) sufficient time to be completely destroyed prior to the removal of the biocide. The level of residual iodine/iodides in the water after the resin chamber is typically about 2 ppm, and preferably ranging from about 1.5–4 ppm, and this level is sufficient to complete the destruction of the microorganisms in the extended contact time chamber, because the microorganisms have already been partially-treated by direct contact with biocide resin in the resin chamber. In other words, initiation of microorganism destruction must start in the resin chamber, where the effective concentration of biocide is higher, and then completion of destruction takes place in the extended contact chamber. Without the initiation in the resin chamber, destruction in a contact chamber with 2 ppm iodine/iodides would require at least 20–30 minutes time.

The complete destruction of the microorganisms before exiting the extended contact time chamber is important because partially-destroyed microorganisms can recover if biocide is prematurely stripped away from the outer cell wall of the microorganisms. Such recovered microorganisms can reappear in the effluent water downstream of a treatment zone and can become even more problematic, since most iodine/iodide removal medias have the potential to become breeding grounds for bacteria growth.

In the biocidal resin chamber of the present invention, the water carrying such iodine/iodides first interacts with the microorganisms and preferably then passes through a baffle or a special disk which causes a spinning action of the water to create a mixing, turbulent motion in the water as it is immediately entered into the extended contact time chamber the cubic dimensions of which are determined, as described below, according to the desired flow rate of purified water. The greater the volumetric capacity of the extended contact time chamber, the greater the resulting water flow rate without loss of performance so long as the primary contact within the iodinated resin bed is maintained at not less than 3.7 seconds.

Once the water has passed through the biocidal resin chamber and has been caused to dwell within the extended contact time chamber, the microorganisms will be completely destroyed, and the only components in the water remaining to be removed are the biocide residuals. The biocide is then removed from the water when the water is passed into the next media chamber preferably containing granular activated carbon to remove the iodine and a specially formulated removal media to absorb the iodides. After the water passes through the biocide removal medias of the filter, it is then passed through a separation pad to the last chamber of the filter, as discussed below, which contains bacteriostatic polishing media.

It is yet a further goal of this invention to eliminate the problem of back contamination to prevent bacterial colonies present downstream of the water treatment device from spreading upstream to where they reach the effluent end of the filter and possibly contaminate the biocidal removal media used therein. As mentioned above, it is desirable to pass the water first through a pretreatment of activated carbon prior to the disinfection treatment in the filter of this invention, and this activated carbon filtration also helps decrease the potential for back-contamination since it removes organic matter prior to disinfection of the water. However, there is always some opportunity for back contamination in water which is standing for several hours, such as overnight. When the device is not being operated and water is standing therein, bacteria growth downstream of the device, such as at the mouth of the faucet, can spread back up into the device from its downstream end. To prevent such back-contamination, the present invention preferably includes a last chamber containing a bacteriostatic media such as silver-impregnated activated carbon, for example, containing 1.05 wt-% silver. The bacteriostatic media in the last chambers resists the entry and spread of such bacteria as it provides an inhospitable environment for such microorganisms and displays a biocidal quality itself. Such microorganisms reaching the device's effluent port are thus resisted and once the flow is restarted, such microorganisms are flushed downstream.

DESCRIPTION OF THE PREFERRED EMBODIMENTS

Figure 1:
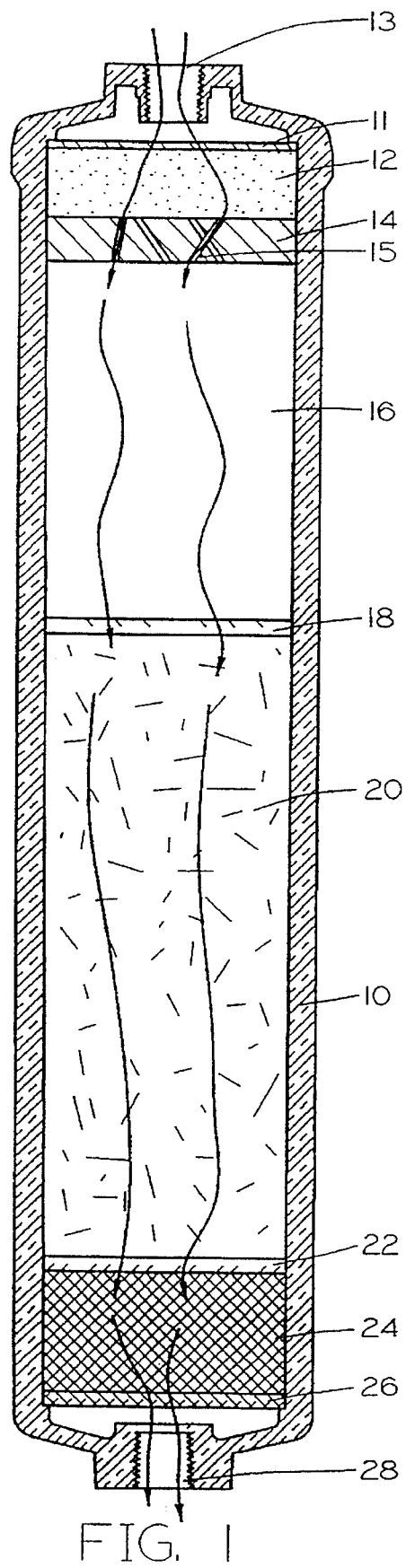
FIG. 1 illustrates a cross-sectional side view of one embodiment of the device of this invention, an in-line filter adapted for mounting on a cold water pipe.

The fluid treatment device disclosed herein is, in one embodiment, an in-line filter (FIG. 1) and, in other embodiment, a cartridge filter (FIG. 2), for disinfecting non-potable water containing pathogenic microorganisms such as bacteria and most viruses, comprising preferably a hollow tubular container having a water-permeable influent end and a water-permeable effluent end with a plurality of chambers axially defined in the container. The chambers are separated by a plurality of semipermeable separators with one of the separators being disposed in fluid communication between each of the chambers at the influent end and the effluent end.

A biocidal chamber is located near the influent end, such biocidal chamber having an axial length and a cubic volume and containing a biocide such as a biocidal resin. The biocidal resin kills the microorganisms while in direct flow contact with the biocidal resin, and the biocidal resin imparts a biocidal effluent into the water. The water carrying the biocidal effluent then passes into an extended contact chamber defined between the biocidal chamber and the effluent end of the chamber, being separated from the biocidal chamber and effluent end by a semipermeable separator and sieve. The extended contact chamber has an axial length and a cubic volume defining a volume filled by the water carrying the biocide effluent whereby the microorganisms are further killed by extending the contact time of the biocidal effluent with the microorganisms in the water. In one embodiment designed for 99.9999% destruction of bacteria and most viruses, the extended contact chamber can contain at least 10 cubic inches of volume per 1.5 liters per minute of water flow to provide an extended contact time of the biocidal effluent and the microorganisms of greater than about six (6) additional seconds, and where the iodinated resin bed is of sufficient cubic volume and bed depth to provide a minimum initial contact of 3.7 seconds.

The filter device may include a biocide removal chamber disposed between the extended contact chamber and its effluent end, such biocide removal chamber containing biocide removal media positioned as follows:[1] granular activated carbon with an iodine number of about 1000 or higher to remove iodine (12), [2] an iodide-scavenging ion exchange resin and [3] a silver-impregnated activated carbon, 1.05% by weight, to polish the effluent water for taste and to maintain the bacteriostatic integrity of the filter device and preventing back-contamination of the medias.

The filter device may also include a filter screen disposed within the extended contact chamber, such filter screen flow biased toward the outlet with openings small enough to retain protozoan cysts, and other microorganisms that require minutes rather than seconds of biocide contact in order to be destroyed. In theory the cysts should permanently remain in the extended contact chamber as the filter screen would have retained them within the extended contact chamber to provide for additional contact with the biocidal effluent to retain them, increase the kill rate, and eventually destroy them.

The filter device may further include a plurality of baffles disposed within the extended contact chamber to cause turbulence therein and to improve contact between the biocidal effluent and the microorganisms to increase the kill rate of the microorganisms.

As shown by the embodiment in FIG. 1, the fluid treatment device may take the form of an in-line filter having an influent end and an effluent end, such ends in fluid communication with the water supply and such in-line filter permitting water to enter the filter, pass through the filter medium, and then exit from the filter in a filtered condition.

Figure 2:
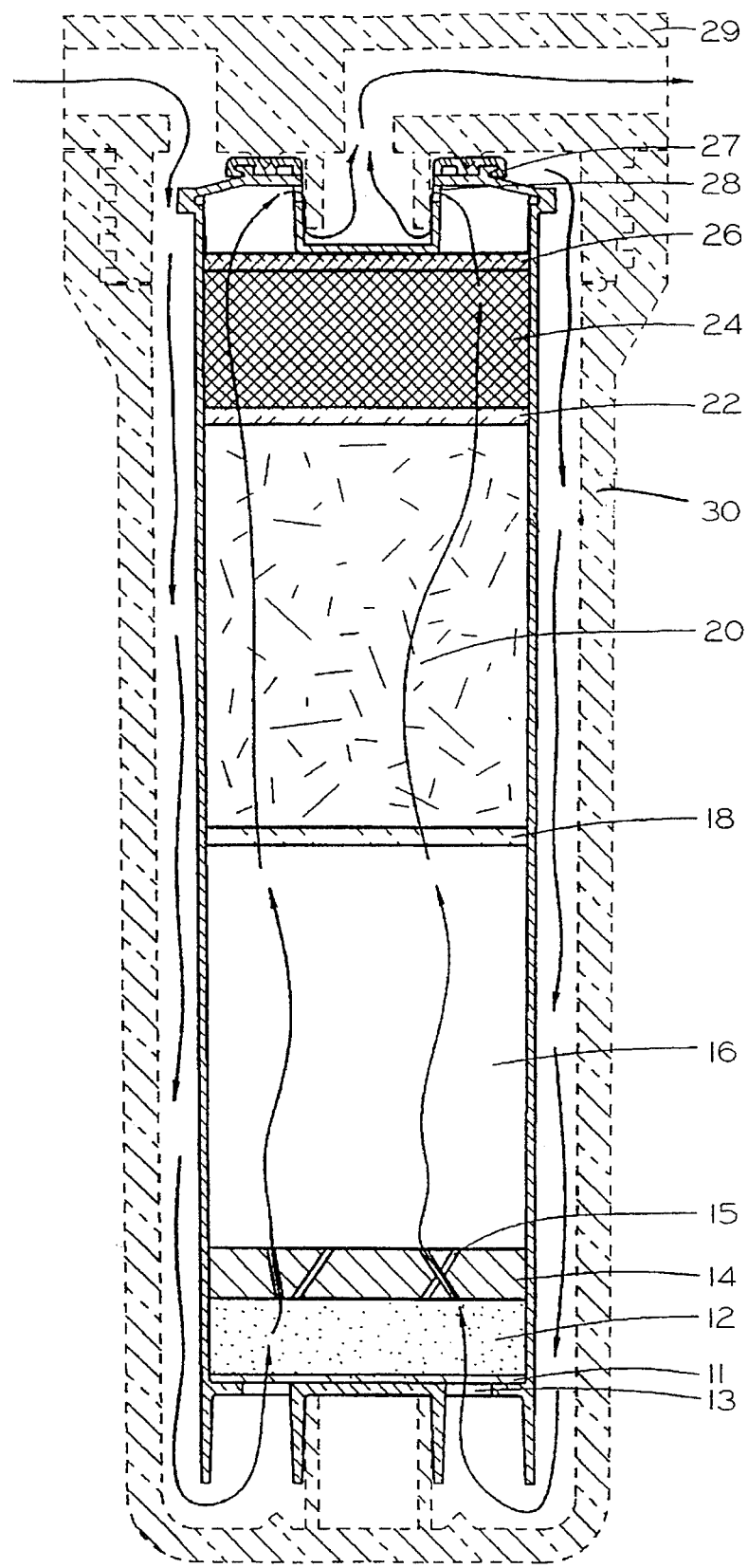
FIG. 2 illustrates a cross-sectional side view of another embodiment of the invention, a cartridge filter disposed in a housing and having an up flow scheme.

As shown by the embodiment in FIG. 2, the fluid treatment device may take the form of a cartridge filter, adapted for arrangement within a housing having an inlet, an outlet and axially-arranged means for communicating fluid entering and exiting the cartridge filter with the inlet and outlet of the housing. Annular sealing means for sealing engagement between the housing and the influent end and effluent end, respectively, of the cartridge filter can be provided, permitting water to enter the cartridge filter, pass through the filter medium, and then exit from the cartridge filter and housing in a filtered condition.

Referring specifically to the Figures, there are shown two, but not the only, embodiments of the invented filter device. FIG. 1 illustrates a side view of the cylindrical, continuous flow filter container 10 of this invention, for mounting in-line in a cold water pipe, having influent end 13 and effluent end 28. The filter can also be in the form of a cartridge to fit into a housing 30 that is in line with the water flow, as seen in FIG. 2. Filter container 10 can be of any diameter and is preferably made of polypropylene. A typical filter diameter can be 1⅝–2½ inches. The chambers described below are linearly-aligned within the filter container, one after the other. In use, non-potable water entering the filter first passes through a separation pad 11 into biocidal resin chamber 12, the diameter of which can be the same or somewhat narrower than the diameter of filter container 10. The water in chamber 12 is in contact with the iodine/iodides from the biocidal resin, as described above, which contact causes the microorganisms' cell membranes to rupture resulting in the microorganisms' destruction. The depth of the biocidal resin media bed should be sufficient to avoid water channeling, a process by which water channels through the bed in such a manner as to partially avoid sufficient contact with the media, which in this case is the biocidal resin. The flow rate must correspond to the volume of the biocidal resin such that a minimum direct contact time of 3.7 seconds is accomplished between the biocidal resin and the microorganisms within the iodinated resin media chamber.

The water is then preferably passed out of the biocidal chamber 12 by a baffle or baffles, such as through turbulating disk 14. The turbulating disk 14 has a plurality of short, tubular openings 15 therein disposed at various angles to the length of the pipe and hence to the direction of the water flow. The positioning of the tubular openings causes the water to pass there through in a turbulent, twisting fashion immediately into the extended contact time chamber 16, thereby creating a turbulence in the water in the chamber 16. The extended contact chamber 16, when there is no water flow, is an empty portion of filter container 10. Because of the length of the extended contact time chamber, the water is contained therein as it passes therethrough for a sufficient period of time to allow the iodinated resins to continue their killing action of the partially-treated microorganisms until such microorganisms are completely destroyed.

It should be noted that the extended contact time chamber of this invention is not analogous to the holding tanks of the prior art. Holding tanks of the Prior art are designed to treat certain virus strains and protozoan cysts such as Giardia lamblia and Cryptosporidium, both of which require contact with the biocide for a time of up to 20 minutes for full treatment. Conversely, the extended contact time chamber of this invention is designed to amplify the destructive capabilities of the biocide against microorganisms which may be destroyed in less than about ten (10) seconds.

In the preferred filter device and method of this invention, the water flow passes through extended contact time chamber 16, through screen 18, and into biocidal removal media chamber 20. The screen 18 is preferably a 1-3 micron screen, which retains cysts in the extended contact chamber 16. As shown in the Figures, screen 18 is preferably disposed only within the extended contact chamber, for retaining cysts only in the extended contact chamber. The media in biocidal removal chamber 20 may be, for example, a combination of high iodine number granular activated carbon followed by a specially formulated iodide removal media. The volume of the biocidal removal media will vary depending on the configuration of the cartridge, but the quantity of iodine/iodide removal media should be equal to or greater than twice the amount of iodinated resins of said resins providing an effluent iodine/iodide of not more than 2 parts per million and where the desired removal of both iodine and iodides is 99.9999% over the stated life of the filter cartridge. A greater volume ratio of biocidal removal media to biocidal resin can be utilized if a greater water flow rate is desired. After the iodine/iodides is removed in the biocidal removal media chamber 20, the water then passes through separation pad 22 into the back contamination barrier chamber 24. Chamber 24 may contain at least 1 inch of bacteriostatic media such as silver-impregnated carbon 1.05% by weight which is a commercial product produced by various companies. A separation pad 26 helps retain the bacteriostatic media in place.

Extended contact time chamber 16 is the key to the success of the invention herein, because 1) the chamber 16 allows the volume of resin in the resin chamber 12 and the residence time of water in the resin to be reduced compared to prior art methods and apparatus, and 2) water is not required to remain stationary as required in prior art holding tanks since screen 18 is used for cyst retention within the extended contact time chamber, allowing the cysts to be collected and retained therein.

The longer the length of extended contact time chamber 16 within the device of this invention, the greater the period of contact time of the iodine/iodides in the biocidal resin with microorganisms present in the water. The volume of the extended contact time chamber has been determined to allow sufficient additional iodine/iodide to microorganism contact time at a level of 10 to 12 cubic inches of chamber 16 volume to safely destroy 99.9999% of all bacteria and most virus strains at a flow rate of 1.5 liters per minute which calculates to be a residence time of about 7–8 seconds. If the flow rate is to be increased, the volume of the primary iodinated resin bed must be established to provide a minimum initial contact of at least 3.7 seconds, while the extended contact time chamber should be increased proportionately for each additional 1.5 liters of flow rate to maintaining a 7–8 second residence time. For example, a flow rate of 3 liters per minute would then require essentially twice the amount of resin needed for initial contact and twice the contact chamber volume to properly purify the water at the increased flow rate. In order to provide adequate residence time in contact chamber 16 while also minimizing overall filter size, chamber 16 is preferably sized for a residence time ranging from 7–8 seconds, but may also be effective and economical when sized for longer residence times, for example, ranging from 6–15 seconds.

As discussed above, for 99.9999% microorganism destruction, the minimum direct contact time between water and biocide resin in the biocide chamber 12 is 3.7 seconds. The preferred resin contact time is the minimum contact time, or close to the minimum, that is, a resin contact time in the range from about 3.7 to about 6 seconds. Resin contact times less than 3.7 seconds would give less than 99.9999% microorganism destruction.

FIG. 2 illustrates a similar filter device to that of FIG. 1, except that the device is a cartridge disposed in a reverse direction within cartridge housing 30 having a lid 29 thereon retaining the cartridge in place. The arrows show the water flow through inlet 31 down to in fluent end 13 of the filter where the water passes through the filter, as described above, to effluent end 28 and out outlet port 33. The filter can be sealed by gasket 27 against lid 29.

The invented filter device purifies a high, continuous water flow rate without a large biocide resin volume and without a holding tank. The high flow rate is possible because the extended contact chamber extends microorganism destruction time without the need for excess resin, a holding tank, or batch processing. Thus, the combination of resin chamber and extending contact chamber allow effective, continuous-flow purification of water containing microorganisms that can be killed in a matter of seconds, rather than minutes, of contact with biocide. For water that contains microorganisms that require minutes of biocide contact for destruction, the invention may include a cyst-removal screen 18 to retain cysts and similar microorganisms for a residence time of greater than about 20 minutes, while the water continues to flow.

In the description and claims, the terms "filter" or "filter device" may refer to in-line filters, filter cartridges, or other devices and shapes having the chambers of this invention arranged for series flow. The chambers of this invention are preferably, but not necessarily, axially and linearly-aligned in a single container or housing. Alternatively, the invention also includes devices with the said chambers in series flow but not co-axially or linearly-aligned, for example, wherein said chambers lie side-by-side in a housing with fluid conduit connecting the chambers in series flow. The term "chamber" refers to a space or volume, defined in a container or housing, which is in fluid communication with other chambers, but is separated from the other chambers to an extent that prevents migration of resin, activated carbon, etc., between chambers. This separation may be done, for example, by semi-permeable separator disks or other means.

Although the present invention has been described with reference to particular embodiments, it will be apparent to those skilled in the art that variations and modifications can be substituted therefor without departing from the principles and spirit of the invention.

What is claimed is:

1. A fluid treatment device for disinfecting non-potable water containing pathogenic microorganisms comprising protozoan cysts, said device comprising:

a hollow container having water-permeable influent end and effluent ends;

a plurality of chambers defined in said container and arranged in series flow fluid communication with each other and with the container influent and effluent ends, said plurality of chambers comprising:

a biocidal chamber defined near said influent end, said biocidal chamber having an axial length and a volume, said biocidal chamber containing biocidal media, said biocidal media being a means for killing said microorganisms while in direct flow contact with said biocidal media and said biocidal media also being a means for imparting a biocidal effluent into water; and an extended contact chamber defined between said biocidal chamber and said effluent end, said extended contact chamber having an axial length and a volume filled by the water carrying said biocidal effluent, said extended contact chamber being a means for extending the contact time of said biocidal effluent with said microorganisms for killing said microorganisms, and wherein the device further comprises a cyst-retention means disposed only within said extended contact chamber, said cyst-retention means being for retaining protozoan cysts within said extended contact chamber to provide for additional contact between the cysts and the biocidal effluent to improve the kill rate of said protozoan cysts.

2. The device of claim 1 being an in-line filter, said in-line filter having an influent end and an effluent end, said ends for being in fluid communication with a supply of said water, said in-line filter permitting water to enter said filter, pass through said chambers, and then exit from the filter in a filtered condition.

3. The device of claim 1 being a filter cartridge, said filter cartridge having an influent end and an effluent end, said ends in fluid communication with a supply of said water, said filter cartridge permitting water to enter said filter cartridge, pass through said chambers, and then exit from the filter cartridge in a filtered condition.

4. The device of claim 1, wherein the said cyst-retention means comprises a filter screen disposed within said extended contact chamber, said filter screen flow biased toward said outlet, and said filter screen having openings small enough to retain protozoan cysts.

5. The device of claim 1, further comprising a baffle disposed within said extended contact chamber, said baffle being a means for causing turbulence in the extended contact chamber to improve contact between said biocidal effluent and said microorganisms to increase the kill rate of said microorganisms.

6. The device of claim 1, wherein the said plurality of chambers further comprises: a biocide removal chamber defined between said extended contact chamber and said effluent end, said biocide removal chamber containing biocide removal medias comprising granular activated carbon with an iodine number of 1000 or greater and an iodide-scavenging media.

7. The device of claim 6, wherein the said plurality of chambers further comprises: an anti-back-contamination chamber defined between said biocide removal chamber and said effluent end, said anti-back-contamination chamber containing bacteriostatic media.

8. A fluid treatment device for disinfecting non-potable water containing pathogenic microorganisms comprising protozoan cysts, said device consisting of:

a hollow container having water-permeable influent end and effluent ends;

a plurality of chambers defined in said container and arranged in series flow fluid communication with each other and with the container influent and effluent ends, said plurality of chambers comprising:

a biocidal chamber defined near said influent end, said biocidal chamber having an axial length and a volume, said biocidal chamber containing biocidal media, said biocidal media being a means for killing said microorganisms while in direct flow contact with said biocidal media and said biocidal media also being a means for imparting a biocidal effluent into water; and an extended contact chamber defined between said biocidal chamber and said effluent end, said extended contact chamber having an axial length and a volume filled by the water carrying said biocidal effluent, said extended contact chamber being a means for extending the contact time of said biocidal effluent with said microorganisms in the water for killing said microorganisms, a biocide removal chamber defined between said extended contact chamber and said effluent end, an anti-back-contamination chamber defined between said biocide removal chamber and said effluent end, said anti-back-contamination chamber containing bacteriostatic media, and a cyst-retention means disposed only within said extended contact chamber, said cyst-retention means being for retaining protozoan cysts within said extended contact chamber to provide for additional contact between the cysts and the biocidal effluent to improve the kill rate of said protozoan cysts.

9. The device of claim 8, wherein said cyst-retention means comprises a filter screen having openings of about 1–3 micron size.

10. A fluid treatment device for disinfecting non-potable water containing pathogenic microorganisms comprising protozoan cysts, said device consisting of:
   a hollow container having water-permeable influent end and effluent ends;
   a plurality of chambers defined in said container and arranged in series flow fluid communication with each other and with the container influent and effluent ends, said plurality of chambers comprising:
      a biocidal chamber defined near said influent end, said biocidal chamber having an axial length and a volume, said biocidal chamber containing biocidal media, said biocidal media being a means for killing said microorganisms while in direct flow contact with said biocidal media and said biocidal media also being a means for imparting a biocidal effluent into water; and
      an extended contact chamber defined between said biocidal chamber and said effluent end, said extended contact chamber having an axial length and a volume filled by the water carrying said biocidal effluent, said extended contact chamber being a means for extending the contact time of said biocidal effluent with said microorganisms in the water for killing said microorganisms,
      a biocide removal chamber defined between said extended contact chamber and said effluent end,
      an anti-back-contamination chamber defined between said biocide removal chamber and said effluent end, said anti-back-contamination chamber containing bacteriostatic media,
   a baffle disposed within said extended contact chamber, said baffle being a means for causing turbulence in the extended contact chamber to improve contact between said biocidal effluent and said microorganisms to increase the kill rate of said microorganisms, and
   a cyst-retention means disposed only within said extended contact chamber, said cyst-retention means being for retaining protozoan cysts within said extended contact chamber to provide for additional contact between the cysts and the biocidal effluent to improve the kill rate of said protozoan cysts.

11. A method of disinfecting non-potable water containing pathogenic microorganisms comprising bacteria and most virus strains, protozoan cysts and other contaminants by filtering comprising the steps of:
   passing water through a chamber containing biocidal media for a period of time of at least 3.7 seconds, whereby biocide is imparted into said water;
   passing said water and biocide through an extended contact chamber for a period of time of about 6–15 seconds;
   passing said water and biocide through a cyst-retention means in said extended contact chamber so that cysts are retained only in the extended contact chamber:
   and passing said water and biocide through a biocide removal chamber containing biocide removal medias.

12. The method of claim 11, wherein the step of passing said water through a chamber containing biocidal media is done for a period of 3.7–6 seconds.

13. The method of claim 11, wherein the step of passing said water and biocide through an extended contact time chamber is done for a period of about 6–8 seconds.

14. The method of claim 11 wherein the step of passing said water and biocide through the cyst-retention means comprises passing said water and biocide through a screen having apertures of about 1–3 micron size.

15. The method of claim 11 wherein less than or equal to 4 ppm biocide is imparted to said water.

16. The method of claim 11, further comprising passing the water and biocide through a baffle immediately before passing the water and biocide through the extended contact chamber.

17. A method of disinfecting non-potable water containing pathogenic microorganisms comprising bacteria and most virus strains, protozoan cysts and other contaminants by filtering consisting of the steps of:
   passing water through a chamber containing biocidal media, whereby biocide is imparted into said water;
   passing said water and biocide through an extended contact chamber;
   passing said water through a cyst-retention means in the extended contact chamber so that cysts are retained only in the extended contact chamber;
   passing said water and biocide through a biocide removal chamber containing biocide removal medias to remove the biocide from the water, and
   passing the water through an anti-contamination chamber containing bacteriostatic media.

18. A method of disinfecting non-potable water containing pathogenic microorganisms comprising bacteria and most virus strains, protozoan cysts and other contaminants by filtering consisting of the steps of:
   passing water through a chamber containing biocidal media, whereby biocide is imparted into said water;
   passing the water and biocide through a baffle;
   passing said water and biocide through an extended contact chamber;
   passing said water through a cyst-retention means in the extended contact chamber so that cysts are retained only in the extended contact chamber;
   passing said water and biocide through a biocide removal chamber containing biocide removal medias to remove the biocide from the water, and
   passing the water through an anti-contamination chamber containing bacteriostatic media.

* * * * *